United States Patent Office 2,748,030
Patented May 29, 1956

2,748,030

HIGH TEMPERATURE RESILIENT DRY LUBRICATION

Herman I. Silversher and George W. Burnett, Los Angeles, Calif., assignors to Electrofilm, Inc., North Hollywood, Calif., a corporation of California No Drawing. Application May 20, 1954,
Serial No. 431,259

9 Claims. (Cl. 117—161)

The present invention relates to processes employing a solid-lubricant for preparing lubricated surfaces.

It is an object of the present invention to provide improved processes for fusing or bonding a solid-lubricant to the surfaces of articles whereby the solid-lubricant is retained semi-permanently in a position to provide lubrication for prolonged periods under adverse conditions, particularly under conditions of excessive temperatures.

It is another object of the present invention to produce articles with surfaces having embedded, impregnated or diffused therein (as distinguished from a mere coating of loose particles), finely divided boron nitride which provides excellent lubrication for prolonged periods of time under high heat conditions, as at temperatures in excess of 1,200° F.

It is a further object of the present invention to provide improved coating compositions containing boron nitride for application on surfaces of articles to provide heat-resistant, semi-permanent lubrication.

Other objects and advantages of the invention will be described and will be apparent from the following description of several embodiments of the present invention:

In the co-pending application of Ralph D. Hall, Serial No. 158,335, now U. S. Patent 2,700,623, there is described a process for bonding and fusing a solid-lubricant to surfaces to provide lubrication. The process of that application provides for bonding the solid-lubricant to a surface by applying the finely-divided solid-lubricant suspended in a solution containing a heat convertible polymerizable resinous bonding agent, all in an amount capable of coating the surface with a continuous semi-permanent lubricating film of the solid lubricant and effecting the bonding of the lubricant to the surface by heat hardening of the bonding agent. In addition to graphite, other solid-lubricants, such as mica, vermiculite and molybdenum disulfide, are disclosed by Hall as solid-lubricants.

In accordance with the Hall application, solid lubricant may be bonded or fused into or onto the surface of the article being treated, in a manner providing lubrication or protection for substantial periods of time without any further treatment. The surface coating obtained has substantial quantities of the finely-divided particles of solid lubricant embedded, impregnated or diffused into the treated surface. The friction surfaces of the particles thus lubricated are reasonably resistant to heat and pressure and they do not deteriorate readily in the presence of oils and other lubricants.

Further in accordance with the Hall application, granite or other solid lubricant is applied as a lubricant to article surfaces which have been prepared to receive the coating. The pre-treatment of the surface to be coated may take any of several forms, including both physically and chemically conditioned surfaces. Where it is desirable to employ the present lubricant under conditions of excessively high temperatures, such as those in excess of 1,200° F., it is most desirable to employ those surface preparations which involve physical roughening or irregularizing of the article surface. The other types of treatment which involve chemical coatings and impregnations may lack stability at elevated temperatures and result in a less efficient lubricating surface. Examples of desirable forms of preparation are acid etching, sandblasting, "shot-peening" and vapor blasting. However, in those cases where the lubricant-coated surface is to be used at temperatures substantially below 1,200° F., preparation treatments of a chemical character (i. e. chemical conversion such as phosphatizing) may be employed.

The present invention contemplates improvements obtained by employing a particular combination of materials which will provide frictional surfaces having superior resistance to excessive heat. Generally speaking, these improved results are obtained by employing coating compositions containing boron nitride as the solid-lubricant and which, when applied to the pre-conditioned or pre-treated surface of the article, will assure optimum sustained lubrication at elevated temperatures.

The process of the present invention starts with the conditioning or treatment of the surface of the article to be coated in order to permit greater adhesion of the solid lubricant-containing coating composition to the surface, and incorporation of the lubricant in the body of the metal. Then a suspension of the finely-divided boron nitride in a resinous vehicle may be applied to the prepared surface in any suitable manner as by spraying, dipping, brushing or the like, and the coated surface is then heated or baked to cure the resinous material and form the desired bond. The boron nitride thus becomes embedded in and firmly bonded to the crystalline steel or iron surface.

As to methods of pre-conditioning of the metal surface, we may use such methods as sandblasting, shot-peening or vapor blasting. Also, various types of chemical etching may be used, such as oxalic acid or sulfuric acid etching of chromium surfaces. As an alternative, one may employ anodizing of aluminum surfaces using either sulfuric or chromic acids. Generally speaking, the conditioning treatment of the surfaces of the article to be coated is for the purpose of providing a porous or anchoring surface for the heat hardening resin binding agent and boron nitride, and to afford such surface irregularities or pores as to permit retention of the boron nitrile within the body of the metal.

The essential components of the coating compositions of the present invention are boron nitride and a heat hardenable binder, specifically a thermosetting synthetic resin. Optionally, the coating composition may also contain a suspending agent to provide a homogeneous suspension of the boron nitride in the coating composition. As prepared for application, the coating composition may be mixed with a thinner or solvent so as to provide proper viscosity, filming, and wetting properties. By employing suitable amounts of thinner, the desirable viscosity may be obtained for most efficient application of the coating composition, whether it be by brushing, dipping or spraying, etc.

It has been discovered that when boron nitride is to be used for temperature lubrication, it is desirable to use resinous binders which have optimum heat resistance. Although these resinous binders may lose their film characteristics and binding properties as a result of being subjected to high temperatures over a period of time, it has been discovered that the boron nitride can become permanently bonded to the treated surface as a result of application with a resinous binder.

The present corporation may be applied to the conditioned or treated surface in the form of a paste or as a liquid which thins the resin binding agent to a degree affording complete filming fluidity. The boron nitride may be applied in combination with other solid lubricants, including graphite, molybdenum disulfide, etc.

It is contemplated that the boron nitride may have small particle size e. g. as small as 20 microns and for some purposes below about 10 microns.

Among the thermosetting resins which may be used are pure phenolic resins; alkyd resins; silicone resins; epoxy resins; furan resins; urea and melamine formaldehyde resins; halogenated polyethylene resins; and butyl titanate resin.

It has been found that an important factor in producing superior wearing characteristics of the coatings is the ratio of thermosetting resin to boron nitride. The most effective weight ratio has been found to be about 100 parts of boron nitride to about between 21 and 168 parts of resin solids. The optimum ratio varies somewhat depending upon the resin used. For example, a ratio of 100 parts of boron nitride to 84 parts of resin is effective when the resin is a phenolic resin.

It is desirable to employ the boron nitride in a concentration of about ¼ to 3½ lbs. per gallon of resin-containing solution. For some forms of application such as spraying or brushing or dipping it is desirable to thin the solid-lubricant-containing composition with any of the customary solvents used to dilute or thin resin solutions. Although the present invention is not limited thereto, methyl ethyl ketone, methyl isobutyl ketone, acetone, ethylene dichloride, toluene, xylene, methyl isobutyl carbinol and dioxane are examples of suitable solvents that may be used as thinners.

As has been disclosed above, it may be desirable to incorporate a suspending agent which minimizes the settling out of the boron nitride. Best results to date have been obtained through the use of a cation-modified clay such as described in U. S. Patent No. 2,531,427 which issued on November 28, 1950, to Ernst A. Hauser. These cationic materials are essentially onium-base derivatives of the clays, such as the ammonium, phosphonium, oxonium, sulfonium, arsonium, stibonium and telluronium derivatives. One suspending agent for use in the compositions is that material supplied by the National Lead Company under the trade name "Bentone 34." This material is dimethyldioctadecylammonium bentonite. It has a specific gravity of 1.8 and is desirably of a small particle size, being in the form of platelets of about 0.05–1.0 micron by 0.002–0.004 micron in size. The concentration of the suspending agent in the coating composition may vary over wide limits, but for superior results the concentration shall vary from about 0.025 to 0.2% by weight of the total composition.

In order to obtain optimum wear characteristics, it is important that the cure coating be within a thickness range of about 0.001 to 0.0002 inch.

The following specific examples of coating operations are given by way of illustration, but should not be taken as limiting the inventions to the details thereof:

*Example 1*

A high temperature friction surface was etched by ordinary sandblasting and there was applied thereto by brushing the following composition:

Parts (by weight)
Silicone resin (Dow Corning #803) _____ 140
Boron nitride _____ 100
Toluene _____ 300

The coated surface was permitted to air-dry and was then baked at a temperature of 500° F. for 2 hours. The resulting surface was found to provide excellent lubrication at temperatures in excess of 1,200° F. and the coating was found to be substantially permanent in nature.

*Example 2*

The friction surfaces of a high carbon steel shaft were cleaned, then etched by shot-peening, after which there was then applied by spray application of the following composition:

Parts (by weight)
Pure phenolic resin (Cincinatti Testing Lab #91 LD) _____ 84
Boron nitride _____ 100
A solvent mixture containing equal parts by weight of methyl ethyl ketone, ethyl alcohol, and dioxane _____ 600

The coated surface was permitted to air-dry and was then baked at temperatures up to 450° F. for 2 hours. The resulting surface was found to provide excellent lubrication at temperatures in excess of 1,200° F. and the coating was found to be substantially permanent in nature.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

*Example 3*

To a sandblasted steel surface was applied the following:

Parts (by weight)
Butyl titanate _____ 84
Boron nitride _____ 100
Toluene _____ 400

This composition was sprayed onto the prepared surface and baked therein at 375° F. for 1 hour and 10 minutes.

What is claimed is:

1. An article having a surface that is subjected in use to substantial mechanical friction for prolonged periods of time under high heat conditions, said surface being substantially completely covered with boron nitride bonded thereto by a heat hardened resin binding agent.

2. An article having a surface that is subjected in use to substantial mechanical friction for prolonged periods of time under high heat conditions, said surface being coated with a film containing boron nitride bonded thereto by a heat hardened resinous vehicle, the film thickness being between about 0.001 to 0.0002 inch.

3. An article having a surface that is subjected in use to substantial mechanical friction for prolonged periods of time under high heat conditions, said surface being substantially completely covered with boron nitride bonded thereto by a heat hardened resin binding agent, said surface having irregularities forming a physical interlock with the boron nitride and resin.

4. An article having a surface that is subjected in use to substantial mechanical friction for prolonged periods of time under high heat conditions, said surface being coated with a lubricating film formed by heat hardening a liquid mixture including a suspension of boron nitride and a binding resin in a resin solvent.

5. An article having a surface that is subjected in use to substantial mechanical friction for prolonged periods of time under high heat conditions, said surface being coated with a lubricating film formed by heat hardening a liquid mixture including a suspension of boron nitride and a thermosetting binding resin in a resin solvent, said mixture containing between about ¼ to 3½ lbs. of the boron nitride per gallon of the mixture.

6. A process for bonding boron nitride to a surface that is subjected in use to substantial mechanical friction, which comprises applying to said surface a thin film containing finely-divided boron nitride suspended in a solution of a heat hardenable resinous bonding vehicle, and heating the coated surface to heat harden said resinous vehicle and effect bonding of the boron nitride to the surface.

7. A process for lubricating a surface that is subjected in use to substantial mechanical friction at high temperatures, which comprises treating said surface to form a large number of minute irregularities therein, coating said irregularized surface with finely-divided boron nitride suspended in a solution of a thermosetting polymerizable resin bonding agent in a volatile solvent, and baking the coated irregularized surface to drive off the solvent, polymerize the resin and bond the boron nitride in place, said suspension containing about ¼ to 3½ lbs. of the boron nitride per gallon of resinous solution.

8. A process as defined in claim 7, in which said solution contains between 20 to 168 parts of resin solids for 100 parts of boron nitride.

9. An article as recited in claim 4, in which said liquid mixture from which the film is formed contains a suspending agent.

References Cited in the file of this patent

UNITED STATES PATENTS

| | | |
|---|---|---|
| 2,152,536 | Cooper | Mar. 28, 1939 |
| 2,330,635 | Siebel | Sept. 28, 1943 |